Nov. 24, 1953  W. DE BACK  2,660,209
BUTT DRIVE MECHANISM FOR PEAR PEELING MACHINES
Filed Sept. 25, 1950  2 Sheets-Sheet 1
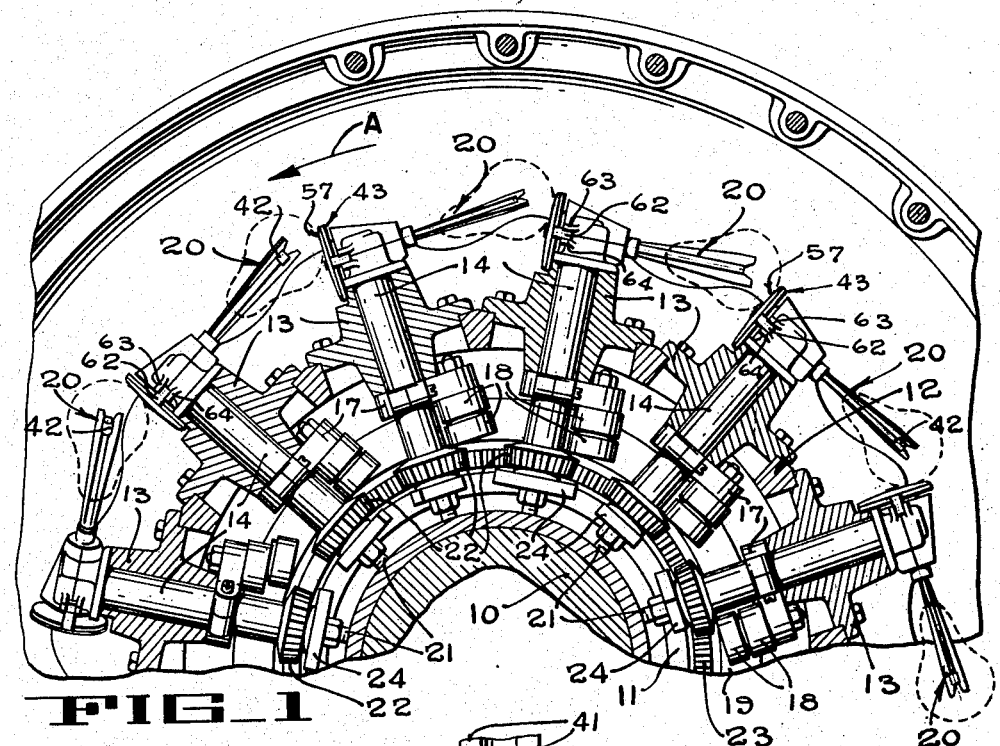
FIG_1
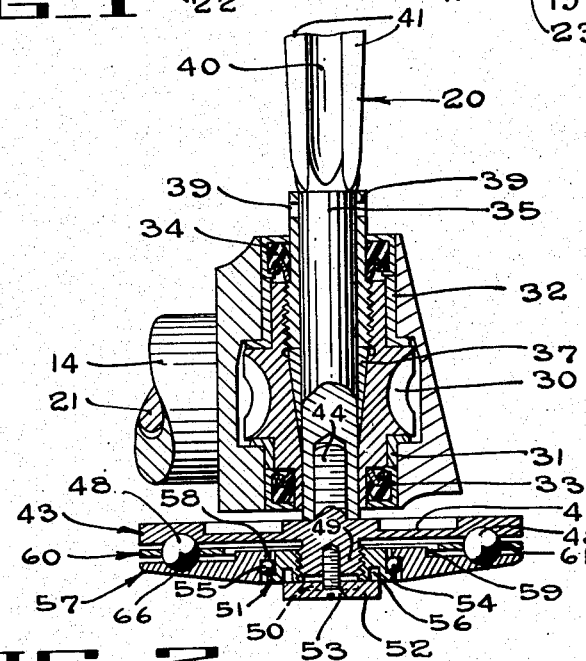
FIG_2
Inventor
WILLIAM DE BACK
By Hans G. Hoffmeister
Attorney

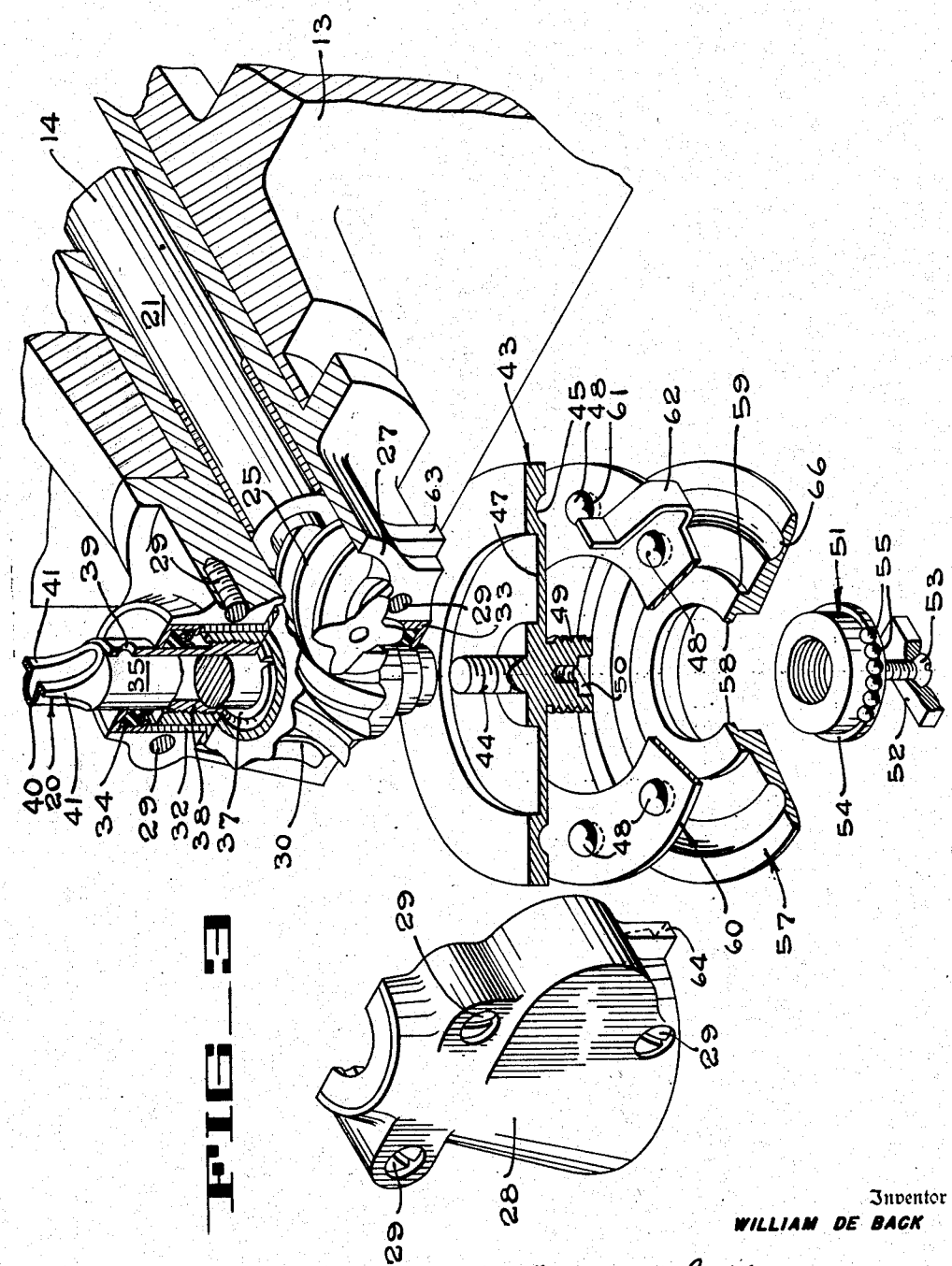

Patented Nov. 24, 1953

2,660,209

UNITED STATES PATENT OFFICE 2,660,209

BUTT DRIVE MECHANISM FOR PEAR PEELING MACHINES

William de Back, San Jose, Calif., assignor to Food Machinery and Chemical Corporation, San Jose, Calif., a corporation of Delaware Application September 25, 1950, Serial No. 186,561

8 Claims. (Cl. 146—43)

This invention relates to a fruit preparation machine, and particularly pertains to a rotatively driven butt drive mechanism for transmitting a rotative impulse to a pear during a peeling operation thereon.

An object of the present invention is to provide an improved butt drive device for a pear impaled on the stemming tube of a fruit preparation machine.

Another object is to provide a simple and positive counter-rotative butt drive mechanism which receives its driving impulse from the rotatably driven stemming tube of a fruit preparation machine.

Another object is to eliminate the necessity for driving alternate stemming tubes of a fruit preparation machine in opposite directions during a peeling operation in order to apply a butt driving impulse to the fruit.

These and other objects and advantages of the present invention will be apparent from the following description and the accompanying drawings wherein:

Fig. 1 is a fragmentary horizontal section through the stemming tube turret of a pear preparation machine of a type on which the present invention is adapted to be mounted, showing the segmental portion of the turret wherein the stemming tubes are in their horizontal position, pears impaled on the stemming tubes being indicated in dotted lines.

Fig. 2 is an enlarged fragmentary section through the stemming tube drive housing taken on a plane through the stemming tube axis.

Fig. 3 is an enlarged, exploded, fragmentary perspective view showing the stemming tube mounting and driving mechanism with the drive housing cap removed, and the parts of the butt drive mechanism of the present invention separated axially of the stemming tube, portions of some of the parts being broken away.

Fig. 1 of the drawings illustrates portions of a fruit preparation machine upon which the butt drive mechanism of the present invention is adapted to be used. This view of the drawings corresponds generally to a portion of Fig. 10 of the U. S. patent application of William de Back et al., Serial No. 114,168, filed September 6, 1949, wherein the illustrated type of fruit preparation machine is fully disclosed. It will be obvious to one familiar with the art that the present invention is not limited to use with said machine, however, but can be used in conjunction with other fruit preparation mechanisms requiring a similar butt-driving arrangement.

As shown in Fig. 1, the pear preparation machine has a central stationary column 10 with a stationary gear and cam support ring 11 secured concentrically thereon. A stemming tube turret 12 is rotatably mounted on the column 10 and is driven by means, not shown, to rotate in the direction indicated by arrow A in Fig. 1.

A plurality of stemming tube mounting plates 13 are mounted in openings provided therefor in the turret 12, and a stemming tube support bushing 14 is rotatively mounted in each support plate 13. The bushing 14 has an arm 17 secured thereto, with rollers 18 journaled thereon to ride between upper (not shown) and lower cam tracks 19 so as to tilt the stemming tube 20 from vertical to horizontal position during the peeling stage (illustrated in Fig. 1) of its circular orbit, and then back to vertical position during other stages (not shown) of its orbit, all as described in the De Back et al. application Serial No. 114,168 mentioned previously herein. In their horizontal position the sharpened pear impaling ends of the stemming tubes are disposed in trailing position relatively to the direction of turret rotation indicated by arrow A in Fig. 1.

A stemming tube drive spindle 21 (Figs. 1, 2 and 3) is rotatably mounted within each bushing 14 and has a spindle drive pinion 22 secured thereon inwardly of the bushing 14. The pinion 22 has toothed driven engagement with a stationary interrupted gear or arcuate rack 23 mounted on the ring 11, thereby to rotate the spindle 21 during the portion of its orbit illustrated in Fig. 1 wherein the stemming tube is in axially horizontal position, and the fruit impaled thereon is being peeled. At other stages of their orbit (not illustrated) wherein the stemming tubes are swung to upright position by the rollers 18 and the cam track 19, the stemming tube drive spindles 21 are secured against rotation by locking cams 24 on their inner ends. The locking cams 24 are adapted to ride on a cam track, not shown, disposed arcuately between the ends of the interrupted gear 23.

The radially outer end of the stemming tube drive spindle 21 has a worm thread 25 cut therein, and is enclosed in a drive housing 27 (Fig. 3) having a cap 28 secured thereon by screws 29. The worm threads 25 of each of the spindles 21 are of the same pitch and hand for all of the stemming tubes. This is an important distinction from the structure of the De Back et al. application Ser. No. 114,168 mentioned previously herein, wherein alternate stemming tubes are required to be driven to rotate in opposite directions. The worm thread 25 on each stemming tube drive spindle 21 is in meshed driving engagement with the teeth of a worm pinion 30 having a hub portion thereof journaled in flanged bushings 31 and 32 (Figs. 2 and 3). The bushings 31 and 32 are clamped in seats provided therefor between the body of the drive housing 27 and its cap 28. Liquid seal rings 33 and 34 are provided beyond the ends of the bushings 31 and 32, respectively, to prevent the entrance of fruit juices or other liquids into the drive housing 27 or the escape of grease therefrom.

Each stemming tube 20 has a round shank portion 35 which is inserted through the bore of the pinion 30 and is secured in adjusted position therein by a split, tapered compression locking sleeve 37. The sleeve 37 is forced by endwise engagement with a threaded sleeve 38, into a tapered recess between the stemming tube shank 35 and the bore of the pinion 30, the bore of the pinion being tapered similarly to the exterior of the sleeve 37 to provide the recess to receive it. The threaded sleeve 38 is screwed into an internally threaded end portion of the bore of the pinion 30, and is provided with holes 39 in its projecting upper end to receive a conventional spanner wrench, not shown.

Each stemming tube 20 has a semi-tubular fruit impaling portion 40 with usual diametrically oppositely extending wings 41 for imparting a rotative driving force to a pear impaled thereon. A short, complementary semi-tubular portion 42 (Fig. 1) also is provided at the outer end of the semi-tubular portion 40 (Fig. 3) the axially outer edges of the wings 41 and of the tubular portions 40 and 42 being sharpened to facilitate their penetration into a pear presented thereto along its stem blossom axis. The complementary semi-tubular portions 40 and 42 sever a cylindrical core portion, including the string-like stem, from a pear impaled along its stem blossom axis on the stemming tubes.

This much of the illustrated structure is similar to that disclosed in the De Back et al. application Serial No. 114,168 mentioned previously herein. The novel butt drive arrangement which is a feature of the present invention comprises a spring driving disk 43 having a threaded shank portion 44 extending axially from one side thereof. The shank portion 44 is adapted to be screwed (Fig. 2) into a correspondingly threaded hole in the end of the stemming tube shank 20, which projects from the drive housing 27 at the opposite end from the tubular pear impaling portion 40. The hand of the threads on the shank portion 44 and in the stemming tube should be such that the torque between the rotatably driven stemming tube 20 and the threaded shank 44 of the driving disk 43 during operation of the machine will tend to screw the shank into the stemming tube, so that the disk 43 becomes, in effect, a rotating element of the stemming tube itself.

A rigid, grooved ball raceway 45 is provided concentrically of the driving disk 43 in the side thereof opposite the threaded shank 44. Provision for resilient adjustment under pressure between the rigid raceways of the present mechanism in a manner to be described later herein is made by means of an annular recess 47 in the opposite side of the driving disk from the raceway 45. The reduced thickness of this recessed portion of the disk, and the character of the material from which the disk is fabricated, allows a slight resilient distortion of the disk 43 when a row of ball bearings 48, riding in the raceway 45 is subjected to a predetermined stress urging them toward the disk. A threaded stud 49 is formed co-axially on the other side of the driving disk 43 from the threaded shank 44, and a key receiving slot 50 is provided diametrically across the outer end of this stud.

An internally threaded inner ball race member 51 is screwed onto the stud 49 and is retained in axially adjusted position thereon by a rectangular locking key 52. The key 52 is adapted to fit into the slot 50 in the end of the stud 49 and to have frictional locking engagement with the end of the inner ball race member 51 to secure it in adjusted position. Holes 56 are provided in the exposed end of the inner ball race member 51 to receive a usual spanner wrench, not shown, for threaded adjustment of the race on the stud 49. The key 52 is of sufficient length to have its ends overlie the inner race member 51, and a screw 53, passing through a central hole in the key 52, is screwed into a threaded hole provided therefor axially of the stud 49 to draw the key into frictional locking engagement with the inner race 51. The slot 50 is of sufficient depth to provide clearance beneath the key 52 when the key is drawn down in the slot 50 into frictional, locking engagement with the inner race member 51 as shown in Fig. 2.

A ball track flange 54 projects radially from the outer end of the inner race member 51 and is adapted to overlie and engage a row of bearing balls 55 inserted for free rolling movement in an annular space provided therefor between the inner race member 51 and the wall of a central opening in a friction drive disk 57. The disk 57 is adapted to have frictional engagement with the butt end of a pear impaled on the stemming tube next forwardly therefrom in the direction of turret rotation when the stemming tubes are in their horizontal position illustrated in Fig. 1. A second ball track flange 58 extends inwardly from the wall surrounding the central opening in the butt engaging friction drive disk 57 to underlie and engage the opposite sides of the balls 55 from those engaged by the flange 54 to provide a thrust ball bearing between the inner race member 51 and the disk 57.

The face of the friction drive disk 57 toward the spring driving disk 43 is relieved marginally at 59 to receive a ball retainer ring 60 which is provided with a plurality of symmetrically arranged ball receiving openings 61 to receive the bearing balls 48 for free rotative movement therein. A ball raceway 66 is provided in the relieved portion 59 of the friction drive disk 57 to have rolling engagement with the opposite sides of the balls 48 from those engaged by the raceway 45 in the driving disk 43.

A slight clearance is provided between the ball retaining ring 60 and the disks 43 and 57 to avoid frictional engagement between these parts during operation of the mechanism. An integrally connected anchoring strip 62 extends radially from the ball retainer ring 60 and is bent (Fig. 3) to lie between a pair of abutments 63 and 64, one of which is provided therefor on the sides of the drive housing 27 and the cap 28, respectively. The strip 62, thus anchored between the abutments 63 and 64, secures the retainer ring 60 and the balls 48 therein against displacement, thereby causing the balls to rotate about fixed centers relatively to the rotative axis of the stemming tube with which they are associated.

Referring now to the operation of the butt drive mechanism of the present invention, it will be noted in Fig. 1 that in its horizontal position the axial center of each stemming tube drive spindle 21 lies along a radius of the turret 12, and that the axis of each stemming tube is normal to the axis of its associated drive spindle 21. Thus the axes of the stemming tubes when horizontal, if projected, would intersect each other midway of the angle between adjacent radii of the turret 12 defined by the axes of the stemming tube drive spindles 21. However, (Fig. 1) the distance from the axis of each stemming tube drive spindle 21 to the exposed, pear engaging surface of the butt engaging friction drive disk 57 mounted on said stemming tube is shorter than the distance from the axis of the spindle 21 to the butt end of a pear impaled on said stemming tube. This difference in respective distances causes the friction disk 57 to engage the butt end of a pear impaled on the stemming tube next forwardly therefrom approximately midway between the respective axes of rotation of the pear and of the friction drive disk which it engages. Since, by means of the present invention, the friction drive disks are driven in the opposite rotative direction from, and at the same rotative speed as the stemming tubes, the engaging portions of the butt ends of the pears and of the friction disks 57 thus are moved in the same linear direction and at substantially the same speed. Therefore, there is no necessity for providing right and left hand drive mechanisms for the alternate stemming tubes as has been the practice in the past, and use of the present invention, results in many obvious maintenance, supply and operational advantages.

In assembling the present mechanism it will be assumed that all of the stemming tubes 20 on the turret 12 of the pear preparation machine are designed for clockwise or right hand rotation as viewed from their pear-impaling ends. In such case the threads in the axial holes in their opposite ends, as well as the threads on the shank portions 44 will be right hand, so that the torque transmitted from the power driven stemming tube to the driving disk 43 on which the shank 44 is mounted tends to screw the shank 44 into the stemming tube so that it will rotate as a substantially integral part thereof. The anchor strip 62 secures the retainer ring 60 and the balls 48 therein against displacement during operation of the mechanism. By removing the screw 53 and the locking key 52 each inner race member 51 can be screwed to axially adjusted position on the stud 49. When thus adjusted, the ball track flange 54 of the inner race member 51 will exert a required amount of pressure on the balls 55, and thence, through the ball track flange 58 and the relatively rigid friction drive disk 57 and the balls 48 to the spring driving disk 43. This pressure, although not excessive, should be sufficient to cause a slight resilient distortion of the portion 47 of the driving disk 43. Thus the balls 48 are maintained in spring pressed, rolling engagement with their raceways 45 and 66 in both disks 43 and 57.

The distortion under pressure of the disk 43 is so slight that no attempt has been made to show it in the drawings. While the pressure exerted on the balls 48 by the raceways 45 and 66 is not critical, it is recommended that after a desired pressure has once been determined for a particular design, the inner race members 51 thereafter be drawn down to exert such pressure by applying a specified torque to each inner race member by means of a conventional torque indicating spanner wrench, not shown. Thus assembly and maintenance will be facilitated, and a uniform and satisfactory operating pressure will be applied to all of the disks on the machine.

With the butt driving mechanism of the present invention thus adjusted and mounted on a stemming tube, rotation of the stemming tube, and thereby of the driving disk 43 secured co-axially thereto, will cause the balls 48, retained in place by the retainer ring 60, to rotate about fixed centers, since the balls are in rolling, spring pressed, frictional engagement with both the raceway 45 in the stemming tube mounted driving disk 43, and with the raceway 66 in the butt engaging friction disk 57. Thus the balls 48 drive the friction disk 57 in the opposite direction from the spring driving disk 43, and at the same speed, since the friction disk 57 is otherwise free to rotate on the thrust bearing including the balls 55.

The exposed parts of the butt drive mechanism of the present invention preferably are of non-corrosive materials, such as corrosion resistant metal, rubber or suitable plastic, or are plated or coated with such material, since they are subject in use to a constant bath of water and fruit juices. These liquids, when the parts are protected against rust and corrosion, serve to lubricate the relatively rotating parts.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is as follows:

1. In a fruit preparation machine having a plurality of stemming tubes adapted to move in axially horizontal trailing position along an arcuate path with a pear impaled in stem end first position on each thereof, a drive mechanism mounted on a forwardly extending portion of each stemming tube and comprising, a disk secured co-axially on the forward end of the stemming tube, a friction disk mounted for free relative rotation on said stemming tube with its axis offset from the axis of rotation of the preceding stemming tube and positioned to engage a surface of a pear impaled on said stemming tube next forwardly therefrom, a plurality of bearing balls mounted in compression between the disk secured to the stemming tube and the friction disk, and means for retaining the balls against displacement and free for rotation in place during rotation of the disk secured to the stemming tube, frictionally to drive the pear engaging friction disk in a counter-rotative direction from the disk secured to the stemming tube.

2. A drive mechanism for mounting on the stemming tube of a pear preparation machine, comprising a driving disk having a concentric threaded stem adapted to screw axially into a stemming tube on a driven rotation thereof, said disk having a rigid annular raceway thereon, an element of said driving disk inwardly of said raceway being resiliently deformable under a predetermined stress, a friction drive disk mounted for relative rotation concentrically of and in spaced relation to said driving disk, a plurality of balls interposed between said disks, means for retaining the balls for free rotative movement about relatively fixed centers, and means for pressing the disks toward each other to exert a compressive stress on the interposed balls sufficient to deform the resiliently deformable portion of said driving disk to place the balls in frictional rotative contact with both disks, thereby to drive the friction drive disk in a counter-rotative direction from that of the driving disk on rotation of the driving disk by a stemming tube.

3. A drive assembly for the forward end of the rotatably driven stemming tube of a fruit preparation machine having a threaded hole axially in one end thereof, said assembly comprising a first disk, a threaded shank mounted axially on said disk and adapted to screw into the axial hole in the stemming tube on a driven rotative movement of the stemming tube, a stud mounted coaxially on the opposite side of the first disk from said shank, an inner ball race adjustably mounted on the stud, means for retaining the ball race in adjusted position on the stud, a pear engaging disk having a central opening therein mounted concentrically of the inner race with the wall of the central opening spaced from said inner race, a plurality of bearing balls mounted in thrust bearing relation in the space between the inner race and the wall of the central opening in the pear engaging disk, a ball retainer ring fixedly interposed between the two disks, said retainer ring having a plurality of ball receiving openings therein, and a plurality of bearing balls mounted for free rotation in the openings of the retainer ring and adapted, by adjustment of said inner race, to be placed under compression between the first disk and the pear engaging disk, frictionally to drive the pear engaging disk in an opposite direction from the first disk upon rotation of the latter by a stemming tube.

4. In combination with a stemming tube mounted for rotative driven movement on the turret of a fruit preparation machine, an impaling portion of the stemming tube being adapted to trail rearwardly from the stemming tube drive housing, the axes of adjacent stemming tubes being offset relatively to each other, a drive mechanism mounted co-axially of the forward end of a stemming tube, said drive mechanism comprising a friction member mounted to rotate relatively to the stemming tube, a portion of said friction member being adapted to engage eccentrically the end of a pear on a stemming tube next forwardly therefrom, a driving member mounted on the stemming tube to rotate co-axially therewith, a retainer adapted to be anchored relatively to the turret of the fruit preparation machine, rotatable means mounted on said retainer and interposed between the pear engaging friction member and the driving member, for rotation about a fixed center, and means for exerting relative axial stresses between said friction member and said drive member toward said retainer mounted rotatable means, thereby frictionally to drive the friction member in a counter-rotative direction from the driving member on a driven rotative movement of the stemming tube.

5. In combination with a plurality of stemming tubes supported for rotative driven movement in the turret of a fruit preparation machine, an impaling portion of each stemming tube being adapted to trail rearwardly from a stemming tube support portion of said turret, the opposite end of each stemming tube extending forwardly from said support portion, the axes of adjacent stemming tubes being offset relatively to each other, drive mechanism comprising a friction member mounted for relative rotation on a forward portion of each stemming tube, a portion of said friction member being adapted to engage eccentrically the rear end of a pear impaled on the trailing portion of an adjacent stemming tube, the zone of engagement between the friction member and the pear being located substantially midway between the offset axes of the adjacent stemming tubes, a driving member mounted on each stemming tube adjacent the friction member thereon to rotate co-axially with its stemming tube, a retainer mounted adjacent each stemming tube, means for anchoring the retainer against rotation about the axis of its stemming tube, a rotary element mounted on said retainer for rolling engagement in place with a friction member and with its adjacent driving member, and means for urging the friction member and the driving member into frictional engagement with said rotary element, thereby frictionally to drive the friction member in a counter-rotative direction from the driving member upon a driven rotation of its stemming tube.

6. In a fruit preparation machine having a plurality of stemming tubes mounted in spaced circumferential relation on a rotary turret with the fruit-impaling portions of the tubes trailing relative to the direction of turret rotation and with the tubes arranged for individual driven rotation in like directions, a butt drive mechanism associated with each tube and comprising a rotary driving member, means interconnecting said member and the associated stemming tube to rotate said member, a driven member mounted for rotation relative to said driving member on an axis offset from the axis of rotation of the preceding stemming tube and arranged to engage a fruit impaled thereon, and rotatable means mounted in frictional engagement with said driving and driven members and held against movement about the longitudinal axis of the stemming tube for effecting rotation of the driven member oppositely to the direction of rotation of the stemming tube upon rotation of the latter.

7. In a fruit preparation machine having a plurality of stemming tubes mounted in spaced circumferential relation on a rotary turret with the fruit-impaling portions of the tubes trailing relative to the direction of turret rotation and with the tubes arranged for individual driven rotation in like directions, a butt drive mechanism associated with each tube and comprising a rotary driving member secured to the associated stemming tube to rotate therewith, a fruit-engaging member mounted for rotation relative to said driving member on an axis common with that of the stemming tube and offset from the axis of rotation of the preceding stemming tube, rotatably mounted means interposed between said driving and fruit-engaging members in frictional rolling engagement therewith and a holder for holding said rotatably mounted means against rotation about the axis of the tube to effect rotation of the fruit engaging member oppositely to the direction of rotation of the stemming tube upon rotation of the latter.

8. In a fruit preparation machine having a plurality of stemming tubes mounted in spaced circumferential relation on a rotary turret with the fruit-impaling portions of the tubes trailing relative to the direction of turret rotation and with the tubes arranged for individual driven rotation in like directions, a butt drive mechanism associated with each tube and comprising a rotary driving member secured to the associated stemming tube to rotate therewith, a fruit-engaging member mounted for rotation relative to said driving member on an axis common with that of the stemming tube and offset from the axis of rotation of the preceding stemming tube, means retained to rotate about a fixed center interposed between said driving and fruit-engaging members and in rolling engagement therewith, and means for exerting a predetermined compressive stress through said driving and fruit engaging members on said interposed rotatable means, said driving member including a portion adapted for resilient distortion under such compressive stress to assure frictional engagement of said driving and fruit engaging members with said retained means so that upon rotation of the stemming tube in one direction, the fruit engaging member is rotated in an opposite direction.

WILLIAM DE BACK.

References Cited in the file of this patent

UNITED STATES PATENTS

| Number | Name | Date |
|---|---|---|
| 899,340 | Simpson | Sept. 22, 1908 |
| 2,524,905 | Granqvist | Oct. 10, 1950 |

FOREIGN PATENTS

| Number | Country | Date |
|---|---|---|
| 197,280 | Great Britain | May 10, 1923 |